May 21, 1929.  F. L. LIPCOT  1,714,130
CUSHION CONNECTION FOR VEHICLE CONSTRUCTION
Filed April 7, 1926
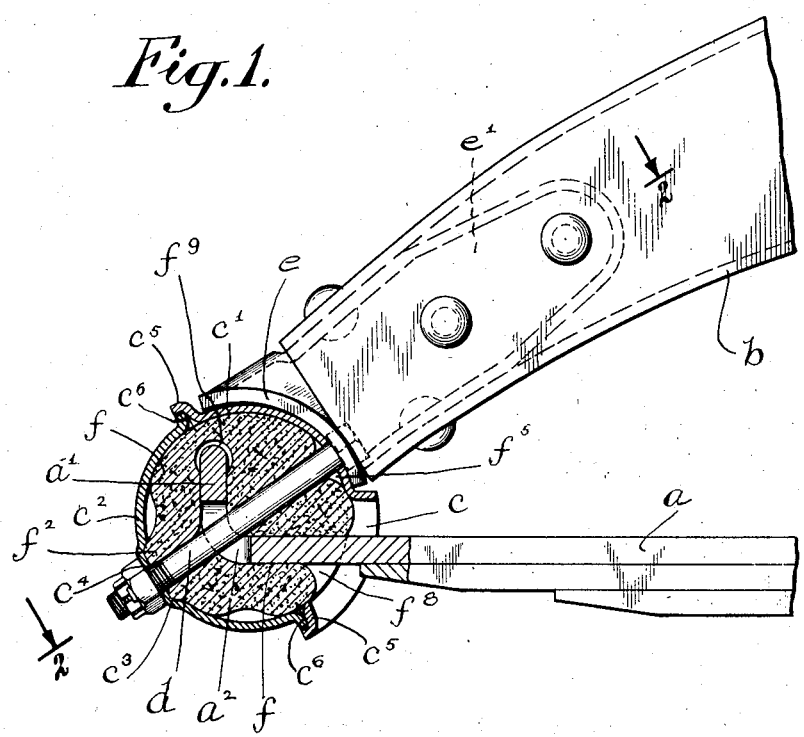
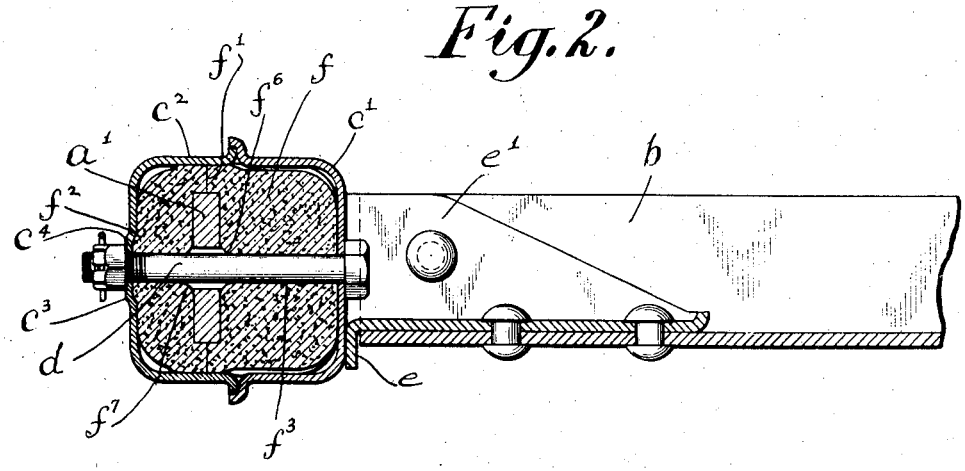
Inventor
FRED. L. LIPCOT
By his Attorneys
Redding, Greeley, O'Shea & Campbell Patented May 21, 1929.

1,714,130

UNITED STATES PATENT OFFICE.

FRED L. LIPCOT, OF NEW YORK, N. Y., ASSIGNOR, BY MESNE ASSIGNMENTS, TO THE RUBBER SHOCK INSULATOR CORPORATION, OF WILMINGTON, DELAWARE, A CORPORATION OF DELAWARE.

CUSHION CONNECTION FOR VEHICLE CONSTRUCTION.

Application filed April 7, 1926. Serial No. 100,208.

In the United States patent to Alfred F. Masury and August H. Leipert, No. 1,404,876 dated January 31, 1922, there is shown a cushion connection for parts in vehicle construction, one of which parts is to be supported by and connected to another part wherein non-metallic yielding material is carried with one of the parts and is availed of to engage the other part. In a preferred embodiment disclosed in that patent the non-metallic yielding material is rubber and is maintained under internal static pressure to increase its strength, resiliency and lasting qualities. In spring suspensions generally, and particularly where a Hotchkiss drive for the vehicle is availed of, one end of the spring is maintained relatively fixed with respect to the chassis frame in order that driving and braking forces may be transmitted therethrough to the vehicle. The present invention has for its object the provision of a cushion connection particularly applicable as a connection and support between the relatively fixed end of a vehicle leaf spring and the frame which shall meet certain requirements of simplicity and economy in manufacture. To this end the housing wherein the yielding non-metallic material engaging the end of the leaf spring is retained is formed of pressed metal and the end of the leaf spring is turned up and perforated for the passage of a bolt also passing through the yielding non-metallic material and serving to retain one of the parts of the housing in position to apply the desired degree of compression. More particularly a drum-shaped two part housing is provided, one of which parts is formed with an aperture for the entrance of the spring end and adapted to be secured by welding to a bracket carried with the vehicle frame. In order that the invention may be clearly understood the same will now be described more fully with reference to the accompanying drawings illustrating a preferred embodiment thereof in which:

Figure 1 is a view in side elevation showing the connection according to the present invention partly in vertical longitudinal section.

Figure 2 is a view taken in the plane indicated by the line 2—2 in Figure 1 and looking in the direction of the arrows.

Referring to the drawings the leaf spring $a$ is adapted to be connected to and support a longitudinal side frame member $b$ of the vehicle through the instrumentality of the cushion connection according to the present invention. The end of the leaf spring which is intended to be retained relatively fixed with respect to the frame enters through an aperture $c$ formed in the upper half $c'$ of a drum-shaped housing divided into two parts in a diametric plane and the other part of the housing $c^2$ serves as a cover member and is removably secured by means of a bolt $d$ passing diametrically through the housing at right angles to the plane of juncture. The main housing portion $c'$ within which the aperture $c$ is formed is rigidly secured to the vehicle frame and in the preferred embodiment this is accomplished by securing the same, as by welding or riveting to a cylindrical seat $e$ formed on the end of a channel-shaped bracket member $e'$ disposed within the channel $b$ and secured as by rivets in the manner disclosed in the drawings.

The yielding non-metallic material $f$ disposed within the housing is substantially cylindrical outwardly and is formed with an angular recess $f'$ for the reception of the end $a'$ of the spring which is turned at right angles of the general longitudinal direction of the spring in order to afford ample bearing surface in the transmission of driving and braking forces. To facilitate the positioning of the yielding non-metallic material within the housing and also to contribute to the facility with which the block may be placed under internal static pressure it is formed with a protruding portion $f^2$ adapted to be positioned within a recess $c^3$ formed in the lower housing half $c^2$ about the aperture $c^4$ for the bolt $d$. The passage $f^3$ for the bolt formed in the yielding non-metallic material is preferably countersunk as at $f^5$, $f^6$ and $f^7$ to facilitate the entrance of the bolt therein and also to afford space for the distortion of the non-metallic material when under compression. Similarly the recess $f'$ is countersunk as at $f^8$ where the spring enters. Similarly the recess $f'$ is enlarged as at $f^9$ at its inner end to allow for distortion of the material.

In the interest of manufacture and assembly the aperture $c$ through which the spring enters the housing is formed with a flaring mouth and the flange $c^5$ thereof is also availed of as a part of a continuous seat for the cooperating flange $c^6$ on the closure member $c^2$. It is to be noted that the bolt $d$ holding the two parts of the housing together lies in a plane disposed at an angle to the respective planes of the forces of load and thrust impressed upon the connection, while the line of separation of the housing parts is similarly disposed at an angle thereto and is furthermore perpendicular to the axis of the bolt. The load and thrust is thus most advantageously resisted.

By the construction described a cushion connection is provided for the relatively fixed end of a vehicle leaf spring which is convenient and inexpensive of manufacture, is readily assembled and affords ample means for the transmission of driving and braking thrusts.

Various modifications may be made in the configuration and manner of manufacturing the cushion connection according to the present invention and no limitation is intended by the foregoing phraseology or illustration except as indicated in the appended claims.

What I claim is:

1. In a cushion connection of the character described, the combination with a vehicle leaf spring and frame member of a bracket formed with a curvilinear seat, means to secure the bracket to the frame member, a drum-shaped, two part pressed metal housing, means to secure one of said housing parts to the bracket, one of said housing parts being formed with an aperture through which the end of the spring enters the housing, said spring being formed with an aperture, yielding non-metallic material disposed within the housing and engaging the end of the spring, and a bolt to secure the two housing parts together and passing through the aperture in the spring.

2. In a cushion connection of the character described in combination, a vehicle frame member, a leaf spring having its end turned up at an angle to the longitudinal direction of the spring and formed with an aperture at the point of deflection, a bracket member formed with a cylindrical seat, means to secure the bracket to the frame member, a drum-shaped two part pressed metal housing one of which parts is formed with an aperture through which the end of the spring enters, yielding non-metallic material disposed within the housing and engaging the end of the spring, and a bolt securing the two housing parts together and passing through the aperture in the end of the spring.

3. In a cushion connection of the character described, in combination, a vehicle frame member, a leaf spring having its end turned up at an angle to the longitudinal direction of the spring, a two part housing one part of which is formed with an opening through which the end of the spring enters, yielding non-metallic material within the housing engaging the end of the spring and a bolt securing the two housing parts together and disposed at an angle to the direction of thrust of the spring and to the direction of load.

4. In a cushion connection of the character described, in combination, a vehicle frame member, a leaf spring having its end turned up at an angle to the longitudinal direction of the spring, a two part housing one part of which is formed with an opening through which the end of the spring enters, yielding non-metallic material within the housing engaging the end of the spring and a bolt securing the two housing parts together the line of separation of the housing parts being disposed at an angle to the direction of thrust of the spring and to the direction of load.

This specification signed this 31st day of March, A. D. 1926.

FRED L. LIPCOT.